US006978555B2

(12) United States Patent
Turatti

(10) Patent No.: US 6,978,555 B2
(45) Date of Patent: Dec. 27, 2005

(54) CONVEYOR OF LEAVES AND OTHER PRODUCTS ON A BELT FOR LAYING THE SAME PRODUCTS AS A SINGLE LAYER

(75) Inventor: Antonio Turatti, Cavarzere (IT)

(73) Assignee: Turatti S.r.l., Cavarzere (IT)

( * ) Notice: Subject to any disclaimer, the term of this patent is extended or adjusted under 35 U.S.C. 154(b) by 0 days.

(21) Appl. No.: 10/782,839

(22) Filed: Feb. 23, 2004

(65) Prior Publication Data

US 2004/0184899 A1 Sep. 23, 2004

(30) Foreign Application Priority Data

Feb. 24, 2003 (IT) ............................. RM03A0075

(51) Int. Cl.[7] ............................................. F26B 17/00
(52) U.S. Cl. ............................ 34/587; 34/581; 34/361
(58) Field of Search ............................... 134/124, 126, 134/127, 129, 131, 128; 34/236, 453, 251, 34/361, 403, 406, 458, 508, 509, 510, 581, 34/605, 587; 414/176; 99/450.2; 198/803.5, 198/689.1; 209/643

(56) References Cited

U.S. PATENT DOCUMENTS

| | | | | | |
|---|---|---|---|---|---|
| 2,664,197 | A | * | 12/1953 | Pfister | 209/44.1 |
| 3,770,112 | A | * | 11/1973 | Asfour | 209/557 |
| 4,136,767 | A | * | 1/1979 | Sarovich | 198/404 |
| 4,560,060 | A | * | 12/1985 | Lenhart | 198/803.5 |
| 5,924,217 | A | * | 7/1999 | Peeters | 34/581 |
| 6,161,560 | A | * | 12/2000 | Brink | 134/72 |

* cited by examiner

*Primary Examiner*—Kenneth Rinehart
(74) *Attorney, Agent, or Firm*—Young & Thompson

(57) ABSTRACT

A conveyor of leaves and other products on a belt for laying the same products as a single layer, includes at least a perforated collection belt, at least a suction hood having a surface provided with holes for passage of air flow, an air suction device coupled to the hood, and dragging elements for the collection belt. The collection belt slides by the dragging elements along the perforated surface of the suction hood. The suction device generates an air flow both through the holes of the surface of the suction hood, and through the holes of the collection belt, allowing the coupling on the collection belt of a single layer of the leaves and other products due to their passage close to the collection belt.

23 Claims, 6 Drawing Sheets

CONVEYOR OF LEAVES AND OTHER PRODUCTS ON A BELT FOR LAYING THE SAME PRODUCTS AS A SINGLE LAYER

BACKGROUND OF THE INVENTION

The present invention relates to a conveyor of leaves and other products on a belt for laying the same products as a single layer.

More specifically, the invention concerns a device allowing to lay on a belt leaves and other products for feeding purposes, so as to make it easier and faster possible transportation, lifting, cleaning, washing, drying, ecc.

At present, it exists the needing in industrial processes to convey leaf products such as salads, lettuce, radicchio, spinaches and other food products, toward the transformation lines according an ordered mode, in order to simplify the working and/or packaging.

In fact, said products are generally provided loosely or within bags or tanks to the transformation industries by stores or directly from the fields.

First working step usually provides removal of external foreign bodies and washing of the products suitable for use.

During this step, it arises the needing of uniformly distributing the product, also to more efficiently carry out the cleaning and visual choice operations.

In view of the above, it is well evident the needing of having at disposal a device as suggested by the present invention, allowing to collect leaf product from a conveyor belt on which it is loosely provided to transfer the same on another belt or transportation device, thus realising a single product layer.

SUMMARY OF THE INVENTION

In this context it is included the solution suggested according to the present invention.

It is therefore specific object of the present invention a conveyor of leaves and other products on a belt for laying the same products as a single layer, characterised in that it comprises at least a perforated collection belt, at least a suction hood having a surface provided with holes for passage of air flow, an air suction device coupled with said hood, and dragging means for said at least a collection belt, said collection belt sliding by said dragging means along said perforated surface of said suction hood, said suction device generating an air flow both through said holes of said surface of said at least a suction cap, and through said holes of said at least a collection belt, allowing the coupling on said at least a collection belt of a single layer of said leaves and other products due to their passage close to said at least a collection belt.

Still according to the invention, said conveyor can provide a slidable belt to carry said leaves and other products close to said at least a collection belt.

Preferably, according to the invention, said slidable belt can be provided under said at least a collection belt.

Furthermore, according to the invention, said slidable belt is provided on a support structure.

Preferably, according to the invention, the perforated surface of said suction hood can be a curved surface.

Always according to the invention, said suction hood can comprise a belt for collecting impurities, said belt having holes with sizes lower than the sizes of the holes of said at least a collection belt.

Still according to the invention, said impurity collection belt can slide inside and parallel with respect to said at least a collection belt, allowing filtering impurities present in said laves and other products.

Always according to the invention, said impurity collection belt can place said impurities within a container.

Furthermore, according to the invention, said conveyor can provide means for washing said leaves and other products.

Preferably, according to the invention, said means for washing said leaves and other products can be provided above and/or under said at least a collection belt.

Still according to the invention, said conveyor can comprise a space for collecting water used for washing said leaves and other products.

Always according to the invention, said conveyor can comprise means for drying said leaves and other products.

Preferably, according to the invention, said mans for drying said leaves and other products can be provided on said at least a collection belt.

Furthermore, according to the invention, said drying means can comprise an air suction device.

Still according to the invention, said conveyor can comprise a first and a second collection belt section.

Always according to the invention, said first and a second collection belt section can be superimposed in such a way that said first collection belt section couples with a first side of said leaves and other products, and said second collection belt section couples with the other side of said leaves and other products.

Still according to the invention, air flow for coupling with said first and a second collection belt section can dry said leaves and other products on both sides.

Preferably, according to the invention, said two conveyor belts can be provided vertically.

Furthermore, according to the invention, said conveyor can comprise a space for collection of said leaves and other products taken from said collection belt.

Preferably, according to the invention, said air suction device can be a pump or a fan.

Still according to the invention, said leaves and other products collected by said collection belt can be brought again close said at last a collection belt.

BRIEF DESCRIPTION OF THE DRAWINGS

The present invention will be now described, for illustrative but not limitative purposes, according to its preferred embodiments, with particular reference to the figures of the enclosed drawings, wherein.

DETAILED DESCRIPTION OF THE PREFERRED EMBODIMENTS

Figure 1:
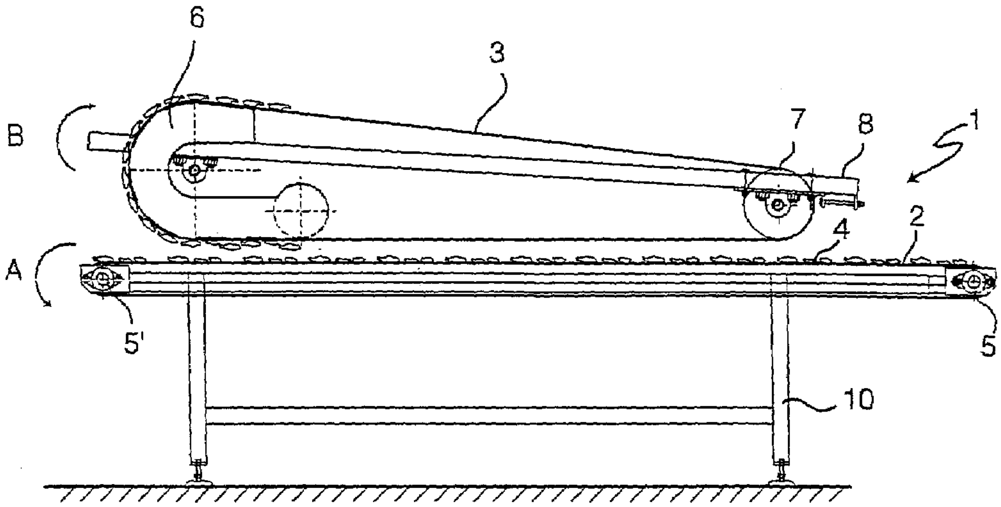
FIG. 1 shows a lateral view of a first embodiment of a device for conveying leaves and other products on a belt with a single layer distribution according to the invention.
Figure 2:
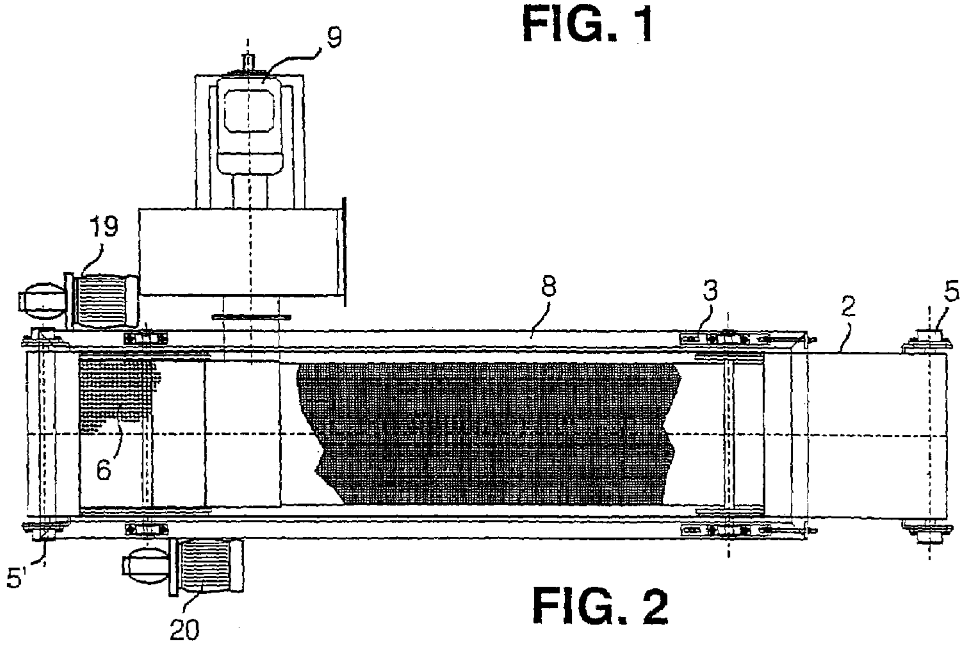
FIG. 2 is a top view of the conveying device of FIG. 1.

Making reference to FIGS. 1 and 2, it can be observed a conveyor 1, mainly comprised of a conveyor belt 2 and of the collection belt 3. Conveyor belt 2 is provided under the collection belt 3. On one end of the conveyor belt 2, product, i.e. leaves or other product, is charged in disorder. Said product 4 is thus dragged on the other end of the conveyor belt 2 rotating according to the direction indicated by arrow A, by the drive shafts 5 and 5'.

Collection belt 3, that is substantially comprised of a large hole network, slides above a suction hood 6 (shown in detail in FIG. 8), providing holes on the surface. Collection belt 3 slides on said suction hood 6 by a shaft 7 fixed on a support 8 according to the rotation direction B.

Once the product 4 arrives close the end of the conveyor belt 2, is sucked by the suction hood 6 and adhered to the collection belt 3. Vacuum is created between the suction hood 6 and the conveyor belt 3, thanks to an air suction pump 9. thus, in correspondence of the suction hood 6 a zone is realised keeping the product 4 adhering to the collection belt 3 while it slides, thanks to the negative pressure on the surface of said collection belt 3.

Consequently, product lays in such a way to realise a single layer on the collection belt 3. Further, it is also possible to obtain a product drying effect, thanks to the air flow to which it is subjected.

Finally, it can be noted that the conveyor 1, in the embodiment described, is placed on a support 10, while the conveyor belt 2 and the collection belt 3 are driven by motors 19 and 20.

Figure 3:
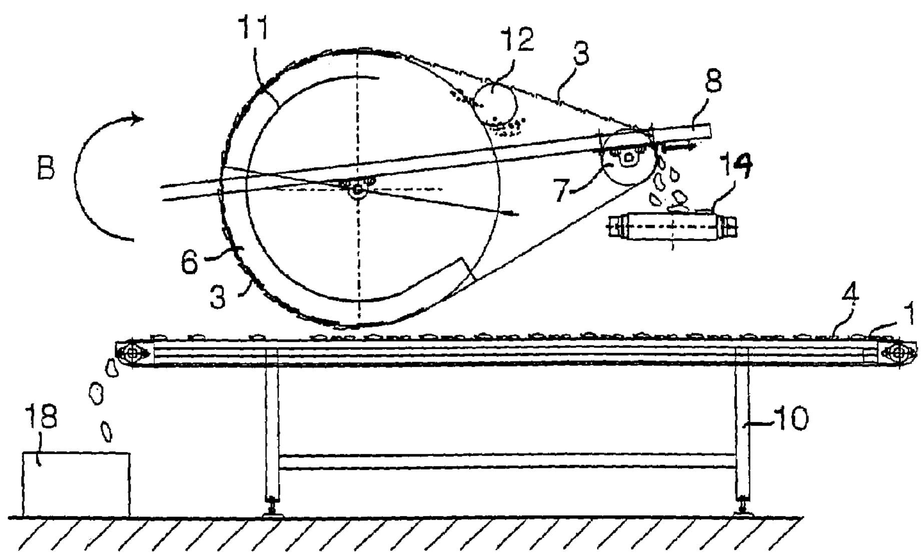
FIG. 3 shows a lateral view of a second embodiment of a conveying device according to the invention.
Figure 4:
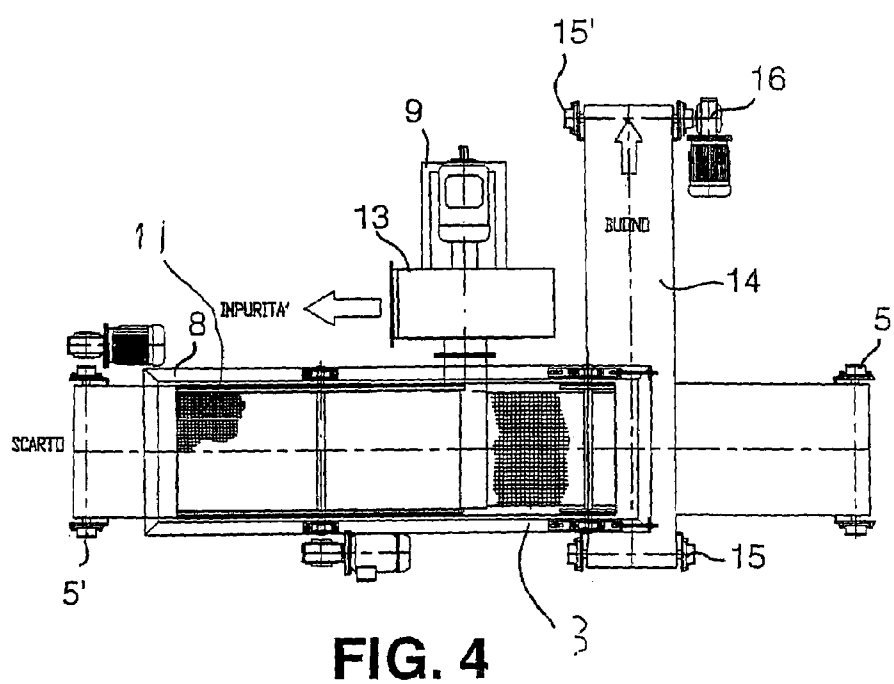
FIG. 4 is a top view of the conveying device of FIG. 3.

FIGS. 3 and 4 show an embodiment of the conveyor 1, providing also the feature of separating, insulating and ejecting impurities that can be present in the product 4.

As it is clear from the enclosed figures, it can be noted that the result is obtained by a modification of the suction hood 6, providing a collection belt 11 under the collection belt 3, said belt 11 having a filtering grain finer than that of said collection belt 3, due to the negative pressure induced by the air flow by the suction pump 9 on the suction hood 6, possible residual matter present in product 4 are collected and maintained adhering on the collection belt 11.

Collection belts 3 and 11 rotate parallel to each other according to direction of arrow B and impurities are brought in a suitable container 12 sucked and ejected by a fan 13.

Product 4, that is placed as a single layer and depurated from the possible impurities is, in this embodiment, collected in a further collection belt 14 and driven by drive shafts 15 and 15' and a motor 16. Instead, product 4 that is not sucked and placed on the collection belt 3, continues flowing until the end of the conveyor belt, accumulated within a container 18, and thus inserted again at the beginning of the circuit of the conveyor belt 2, to be placed as a single layer.

Figure 5:
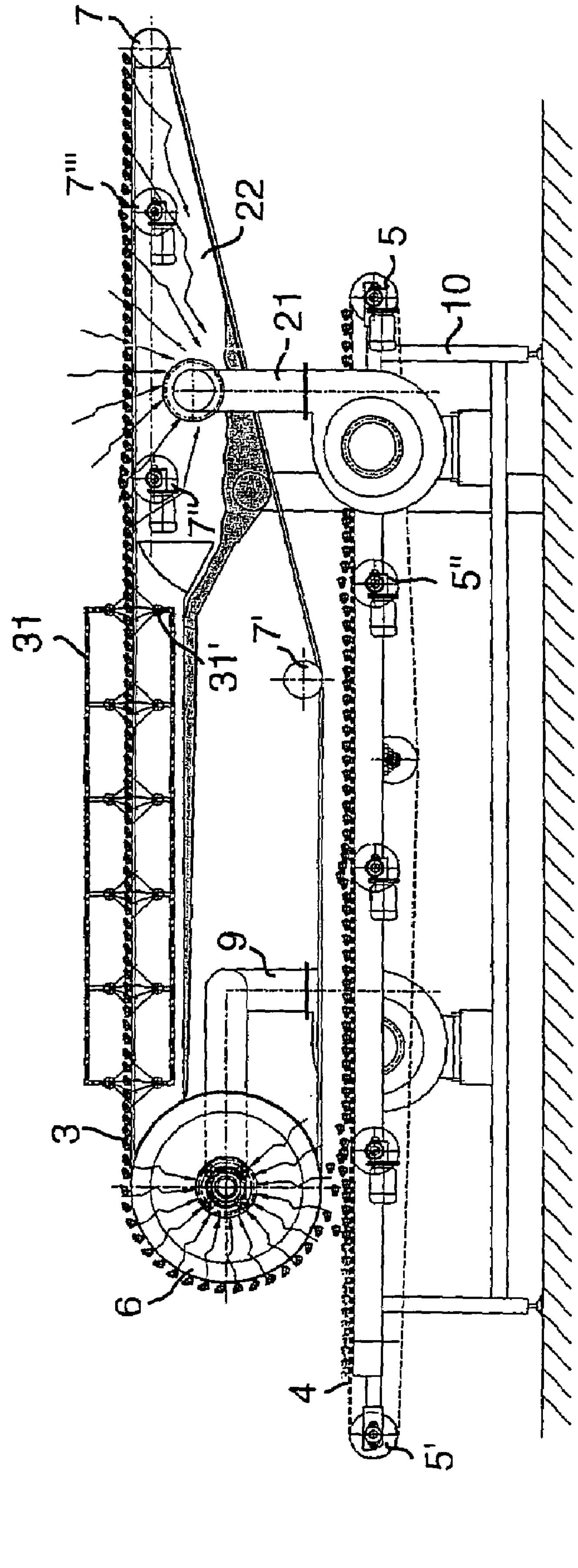
FIG. 5 shows a lateral view of a third embodiment of a conveying device according to the invention.

FIG. 5 shows a conveyor 1, equivalent to the conveyor of FIG. 1, provided with the further functions of washing and drying the product 4.

Particularly, once the product 4 has been placed as a single layer on the collection belt 3, it is made passing through a washing device 31, subjecting the same to a series of water jets from above and from bass. Washing water is then collected within a suitable space 22.

Finally, product 4 is strook by a further air flow, directed downward, induced by the pump 21. Collection belt 3 slides between the suction hood 6 and the shafts 7, 7', 7" and 7'", in such a way to create a space within which said space 22 can be provided.

Figure 7:
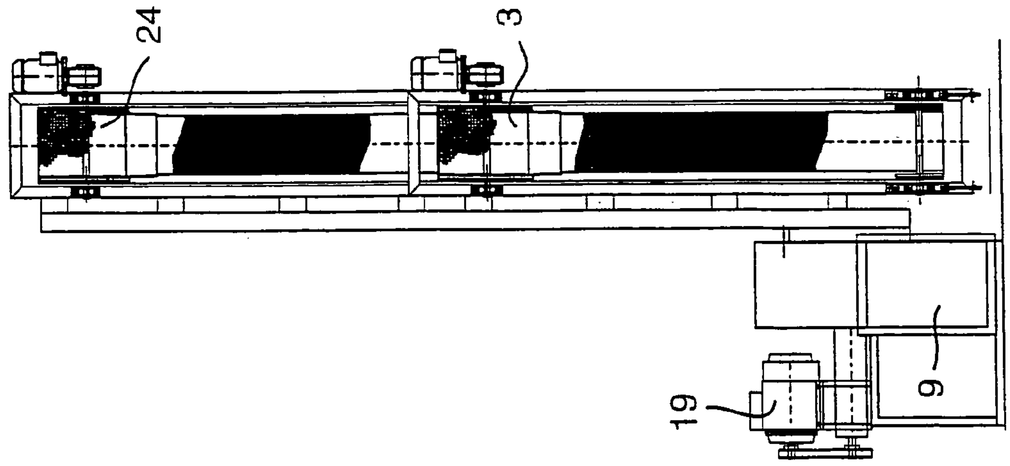
FIG. 7 is a further lateral view of the conveying device of FIG. 6.
Figure 6:
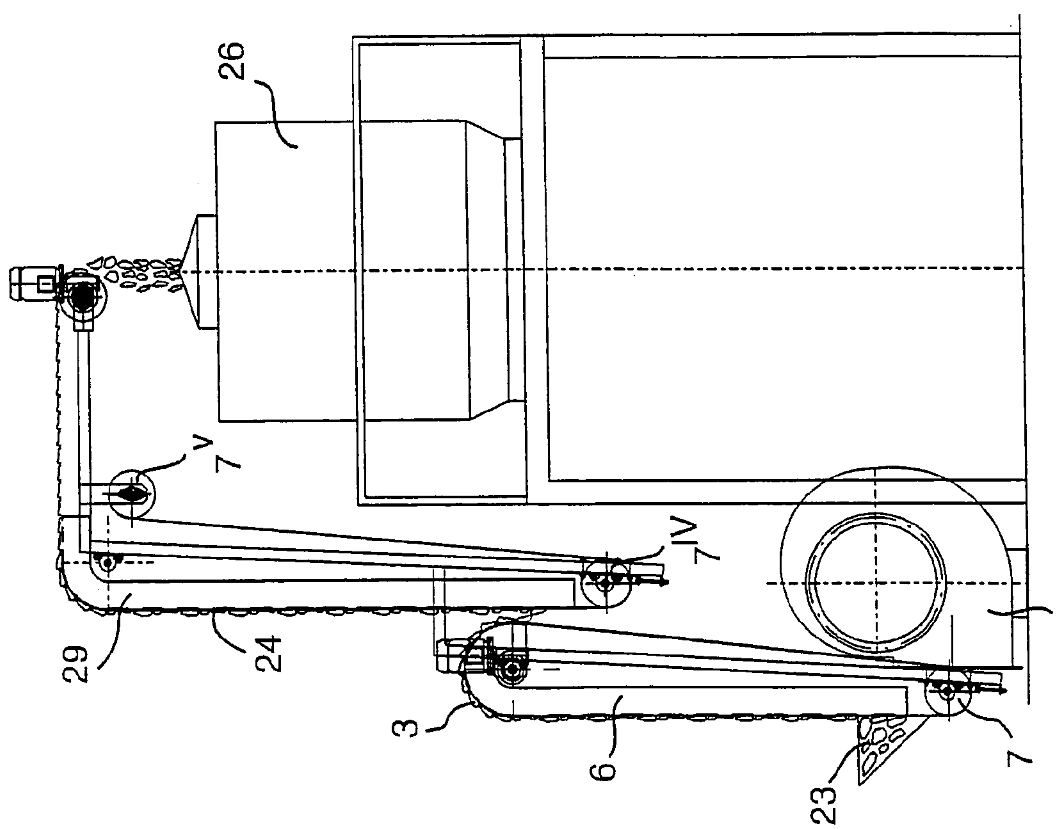
FIG. 6 shows a lateral view of a fourth embodiment of a conveying device according to the invention.

FIGS. 6 and 7 show an alternative embodiment of the conveyor 1, allowing the drying of the product 4 on both sides.

Particularly, once the product 4 has been placed as a single layer on the collection belt 3, it is made passing through a washing device 31, subjecting the same to a series of water jets from above and from below. Washing water is then collected within a suitable space 22.

Observing the figures in detail, it can be noted that product 4 is taken from a hopper 23 directly from the vertical collection belt 3, sliding on the suction hood 6. Air flow, generated by the pump 9, directed on the product 4, allows its drying on the first side. Product 4 is then laid down on another collection belt 24, in this case too a vertical belt, on which it is kept thanks to a further suction hood 25 and to the air flow generated by the latter.

Product 4 is now placed as a single layer on the collection belt 24, but rests on side opposite to the side on which it was rested while flowing on the collection belt 3. In this way, flow generated by the suction hood 25 allows drying of the other side of product 4.

Finally, product 4, dried on both sides and placed as a single layer, can be placed on a new conveyor belt or visually inspected and/or introduced within a container 26, as in FIG. 6.

Figure 8:
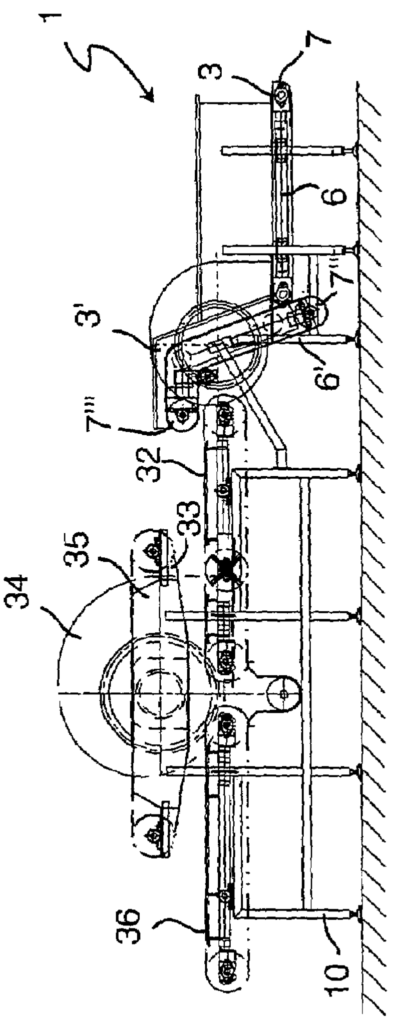
FIG. 8 shows a lateral view of a fifth embodiment of a conveying device according to the invention.
Figure 9:
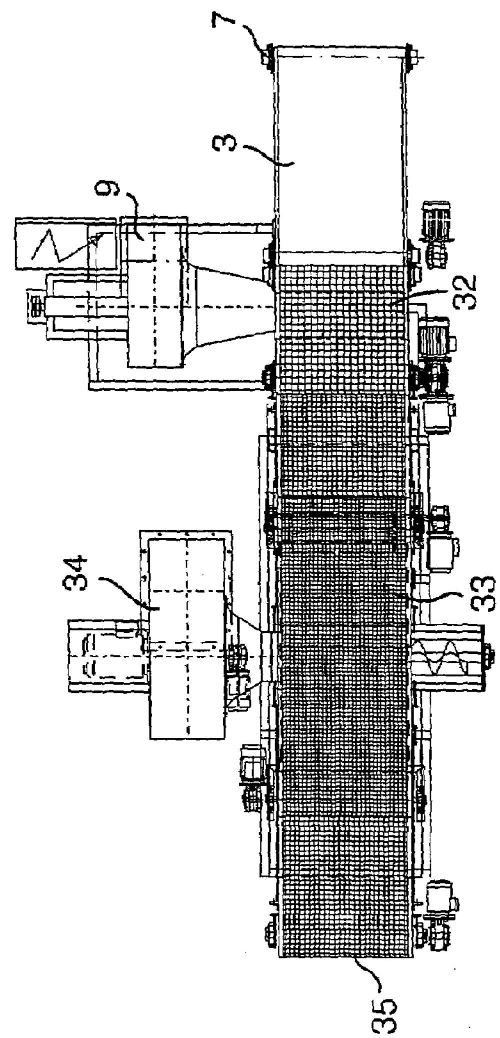
FIG. 9 is a further lateral view of the conveying device of FIG. 8.

FIGS. 8 and 9 show an alternative embodiment of the conveyor 1, allowing the ejection of foreign matter from product 4 by a double filtering. Particularly, product 4, placed as single layer on the collection belt 3 by pressure generated by the air flow from pump 9, is then distributed on the collection belt 3', making the heavier foreign matter falling. Air flows on the collection belts 3, 3' are obtained by the suction hoods 6, 6'. From the collection belt 3', product 4 passes to a further conveyor belt 32, that, vibrating, allow a homogeneous distribution of the product 4 on the surface of the same belt. Thus product is again collected by a collection belt 33, allowing a further filtering of the product, avoiding lifting residual impurities such as insects or little woods. Lifting occurs by the pressure from the pump 34 through the suction hood 35.

Collection belt 33, providing sloped sides, transports the product up to a collection belt 36 on which it falls by gravity, not being provided any air flow in the area where belts are superimposed.

Figure 10:
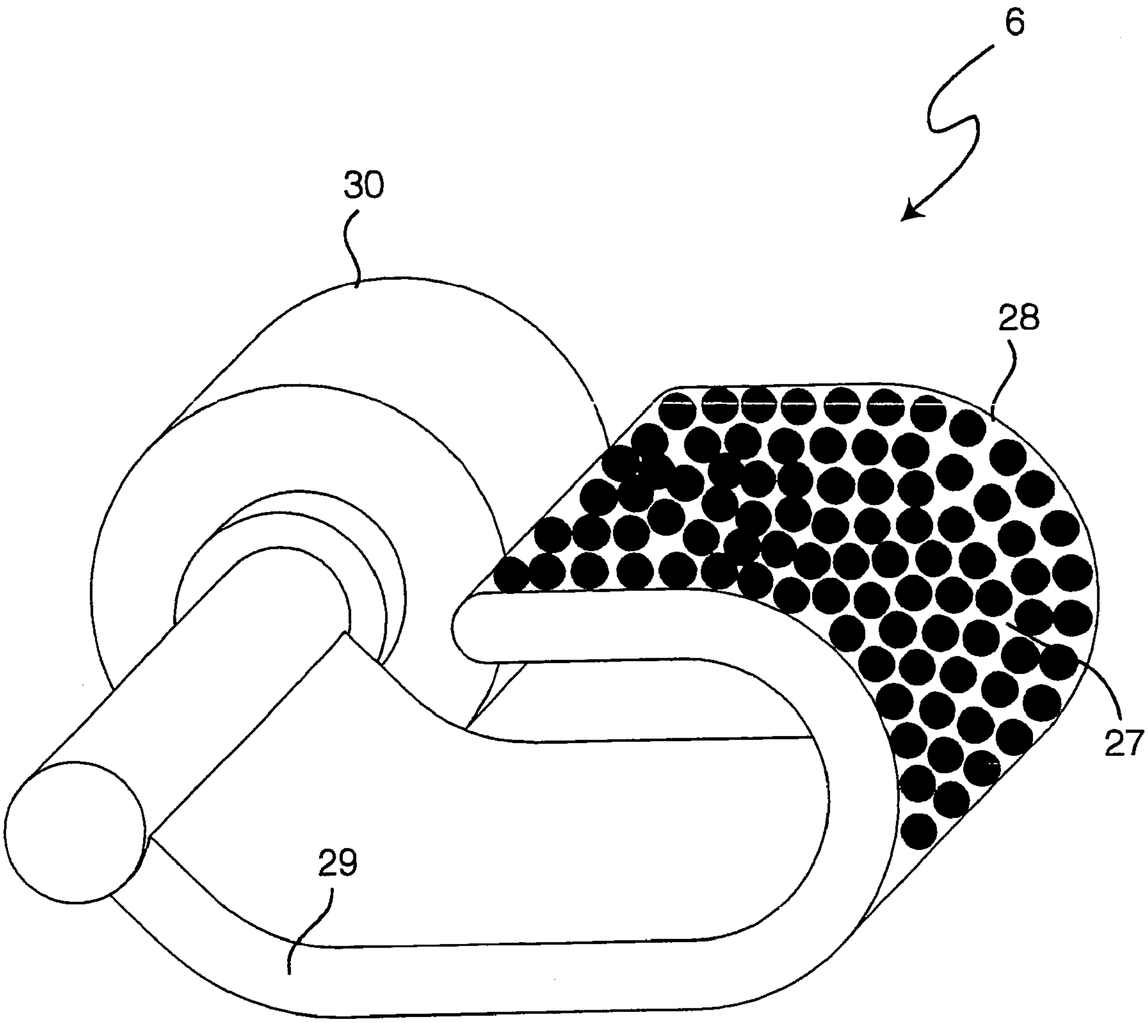
FIG. 10 is a perspective view of the suction hood.

Finally, FIG. 10 shows the suction hood 6. particularly, it can be seen surface 27 on which conveyor belt 3 or 24 slides, and on which air suction holes 28 are realised, said air being sucked within the tube 29. air flow is generated by the pump 9 or by a fan inserted within the cavity.

On the basis of the previous specification, it can be observed that the basic feature is that of creating a depression on a conveyor belt so as to make the leaf product adhering and placing the same as a single layer.

Present invention has the advantage of making it possible to have the product ready for complex operations thanks to its more precise positioning, and at the same time to be able to simply add the functions of filtering impurities and drying the product.

Furthermore, by the present invention, product can be also lifted according to a vertical direction, maintaining a continuous and according to a single layer disposition feeding of the product. In fact, positioning of the product according to a single layer allows to ease their inspection and their eventual analyses by optical selection devices.

Another advantage of the invention is that of filtering both foreign matter with large sizes and weight, and sand particles and/or insects by suction.

Possibility of implementing the device according to vertical orientation allows a remarkable saving of space or a better adaptability to already existing lines.

Finally, product can be cooled and/or subjected to treatment during its transportation and/or lifting.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. Conveyor of leaves and other products on a belt for laying said products as a single layer, said conveyor comprising:

at least one perforated collection belt;

at least one suction hood having a perforated surface provided with holes for passage of air flow;

an air suction device coupled with said hood; and dragging means for dragging said at least one collection belt, said collection belt sliding by said dragging means along said perforated surface of said suction hood, said suction device generating an air flow both through said holes of said perforated surface of said at least one suction hood, and through said holes of said at least one collection belt, allowing the coupling on said at least one collection belt of a single layer of said leaves and other products due to their passage close to said at least one collection belt, wherein said suction hood comprises a belt for collecting impurities, said belt for collecting impurities having holes with sizes lower than the sizes of the holes of said at least one collection belt.

2. The conveyor of leaves and other products according to claim 1, further comprising a slidable belt to carry said leaves and other products close to said at least one collection belt.

3. The conveyor of leaves and other products according to claim 2, wherein said slidable belt is provided under said at least one collection belt.

4. The conveyor of leaves and other products according to claim 2, wherein said slidable belt is provided on a support structure.

5. The conveyor of leaves and other products according to claim 1, wherein the surface of said suction hood having holes is a curved surface.

6. The conveyor of leaves and other products according to claim 1, wherein said impurity collection belt slides inside and parallel with respect to said at least one collection belt, allowing filtering impurities present in said leaves and other products.

7. The conveyor of leaves and other products according to claim 1, wherein said impurity collection belt places said impurities within a container.

8. The conveyor of leaves and other products according to claim 1, further comprising means for washing said leaves and other products.

9. The conveyor of leaves and other products according to claim 8, wherein said means for washing said leaves and other products are provided at least one of above and under said at least one collection belt.

10. The conveyor of leaves and other products according to claim 8, further comprising a space for collecting water used for washing said leaves and other products.

11. The conveyor of leaves and other products according to claim 1, further comprising means for drying said leaves and other products.

12. The conveyor of leaves and other products according to claim 11, wherein said means for drying said leaves and other products are provided on said at least one collection belt.

13. The conveyor of leaves and other products according to claim 11, wherein said drying means comprises an air suction device.

14. The conveyor of leaves and other products according to claim 1, further comprising a first and a second collection belt section.

15. The conveyor of leaves and other products according to claim 14, wherein said first and second collection belt sections are superimposed in such a way that said first collection belt section couples with a first side of said leaves and other products, and a second collection belt section couples with the other side of said leaves and other products.

16. The conveyor of leaves and other products according to claim 14 wherein air flow for coupling with said first and second collection belt sections dries said leaves and other products on both sides.

17. The conveyor of leaves and other products according to claim 13, wherein said first and second collection belt sections are provided vertically.

18. The conveyor of leaves and other products according to claim 13, further comprising a space for collection of said leaves and other products taken from said collection belt.

19. The conveyor of leaves and other products according to claim 1, wherein said air suction device is comprised of a pump.

20. The conveyor of leaves and other products according to claim 1, wherein said air suction device is comprised of a fan.

21. The conveyor of leaves and other products according to claim 1, further comprising means for vibrating said at least one collection belt to more uniformly lay said leaves and other products on said collection belt.

22. The conveyor of leaves and other products according to claim 1, wherein said leaves and other products collected by said collection belt are brought close against said collection belt.

23. Conveyor of leaves and other products on a belt for laying said products as a single layer, said conveyor comprising:

first and second perforated collection belt sections;

at least one suction hood having a surface provided with holes for passage of air flow;

an air suction device coupled with said hood; and dragging means for dragging said first and second collection belt sections, said first and second collection belt sections sliding by said dragging means along said perforated surface of said suction hood, said suction device generating an air flow both through said holes of said surface of said at least one suction hood, and through said holes of said first and second collection belt sections, allowing the coupling on said first and second collection belt sections of a single layer of said leaves and other products due to their passage close to said first and second collection belt sections, wherein air flow for coupling with said first and second collection belt sections dries said leaves and other products on both sides.

* * * * *